UNITED STATES PATENT OFFICE.

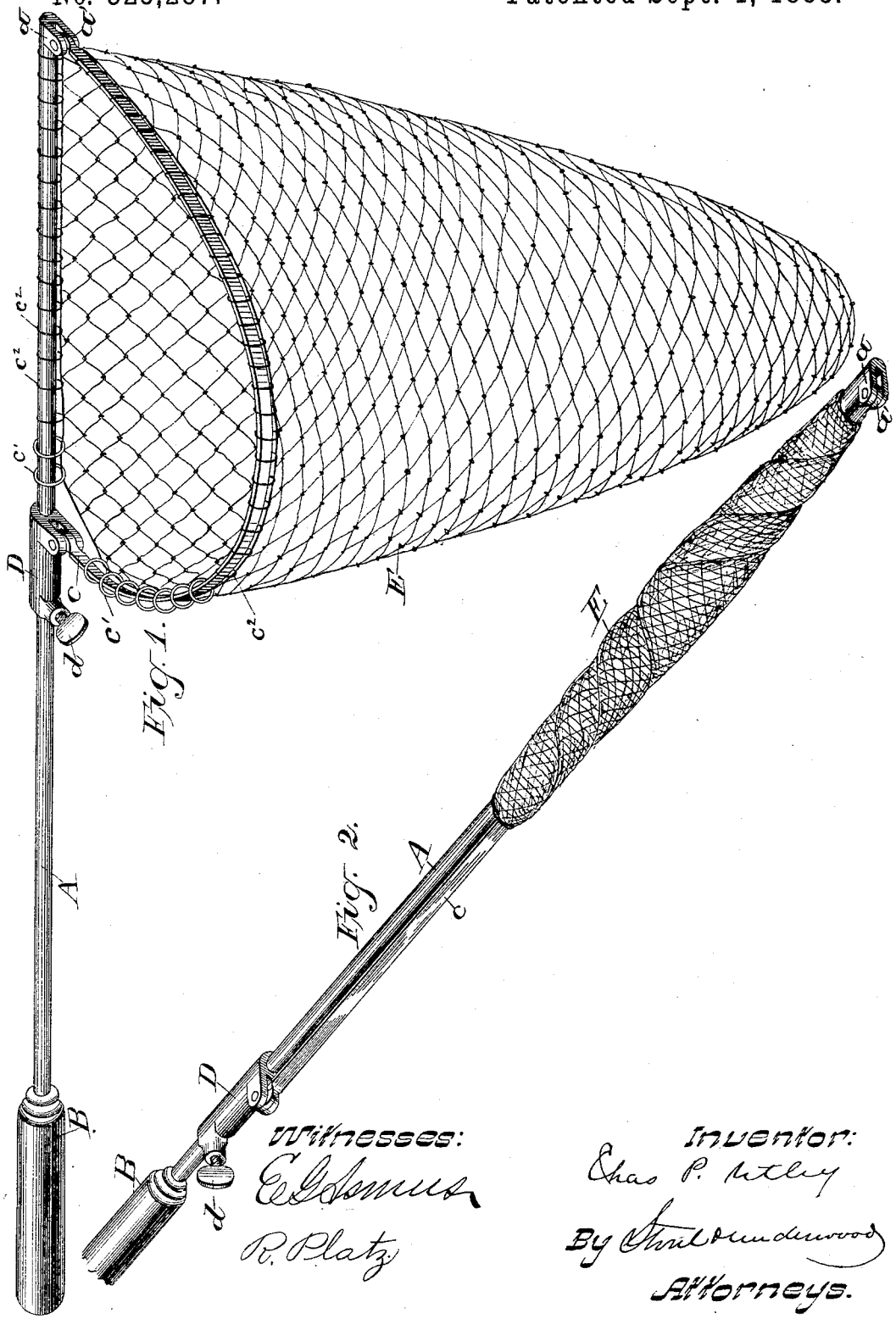

CHARLES P. UTLEY, OF MILWAUKEE, WISCONSIN.

LANDING-NET.

SPECIFICATION forming part of Letters Patent No. 325,287, dated September 1, 1885.

Application filed August 11, 1884. (No model.)

*To all whom it may concern:*

Be it known that I, CHARLES P. UTLEY, of Milwaukee, in the county of Milwaukee, and in the State of Wisconsin, have invented certain new and useful Improvements in Landing-Nets; and I do hereby declare that the following is a full, clear, and exact description thereof.

My invention relates to landing-nets, and will be fully described hereinafter.

In the drawings, Figure 1 is a perspective view of my device ready for use, and Fig. 2 is a like view of my device when collapsed and folded.

A is a rod, which is round, and preferably made tubular, and B is the handle, which may be secured to the rod in any convenient manner. The outer end of the rod is provided with a lug, $a$, which is bifurcated to receive a lug, $a'$, on the end of an elastic band, $c$, which is pivoted therein. The other end of this band is pivoted to a slide, D, that is loosely fitted on the rod A, and which carries a set-bolt, $d$, for locking it at any desired point on the rod A. The end meshes of the net E are looped over the rod A and band $c$, the loops $c'$ nearest the slide D being preferably of inflexible material and larger than the other loops, $c^2$.

When my improved landing-net is folded, the spring $c$ lies close against and parallel with the rod A, and the net can be wrapped around both, as shown in Fig. 2; but when the net is to be used the slide is forced out until the spring is bent into a half-circle, as shown in Fig. 1, when it will hold the mouth of the net open for the reception of the fish.

I may use two springs instead of only one, and I may otherwise slightly vary the construction of my device without departing from the spirit of my invention.

Having thus described my invention, what I claim as new, and desire to secure by Letters Patent, is—

1. In a landing-net, a rod and an elastic band and a slide, the band being pivoted at one end to the outer end of the rod and at the other to the slide, substantially as described.

2. The combination, with the rod and the band pivoted to its outer end, of a slide to which the inner end of the band is pivoted, and a set-bolt for securing the slide in adjustment, as set forth.

In testimony that I claim the foregoing I have hereunto set my hand, at Milwaukee, in the county of Milwaukee and State of Wisconsin, in the presence of two witnesses.

CHAS. P. UTLEY.

Witnesses:
S. S. STOUT,
H. J. FORSYTHE.